(12) United States Patent  
Park et al.

(10) Patent No.: US 10,751,770 B2  
(45) Date of Patent: Aug. 25, 2020

(54) REMEDIATION OF CONTAMINATED SOIL AND WATER USING ENHANCED STIMULATORS

(71) Applicant: TRIUM ENIRONMENTAL INC., Cochrane (CA)

(72) Inventors: Simon Park, Calgary (CA); Byong Jun Min, Calgary (CA); Jevins Lee Waddell, Cochrane (CA); Seonghwan Kim, Calgary (CA)

(73) Assignee: Trium Environmental Inc., Calgary (CA)

( * ) Notice: Subject to any disclaimer, the term of this patent is extended or adjusted under 35 U.S.C. 154(b) by 0 days.

(21) Appl. No.: 15/745,333

(22) PCT Filed: Sep. 6, 2016

(86) PCT No.: PCT/CA2016/051051  
§ 371 (c)(1),  
(2) Date: Jan. 16, 2018

(87) PCT Pub. No.: WO2017/035669  
PCT Pub. Date: Mar. 9, 2017

(65) Prior Publication Data  
US 2019/0009314 A1    Jan. 10, 2019

Related U.S. Application Data

(60) Provisional application No. 62/214,926, filed on Sep. 5, 2015.

(51) Int. Cl.  
*B09C 1/08* (2006.01)  
*B01J 19/12* (2006.01)  
(Continued)

(52) U.S. Cl.  
CPC .............. *B09C 1/08* (2013.01); *B01D 1/0017* (2013.01); *B01D 1/0023* (2013.01); *B01D 5/006* (2013.01);  
(Continued)

(58) Field of Classification Search  
CPC ........... B09C 1/06; B09C 1/08; B01D 1/0017; B01D 1/0023; B01D 5/006; B03C 1/30;  
(Continued)

(56) References Cited

U.S. PATENT DOCUMENTS

| 4,973,811 | A | * | 11/1990 | Bass | ........................ B09C 1/062 166/248 |
| 2002/0008069 | A1 | * | 1/2002 | Kato | ..................... B01D 53/007 405/128.55 |
| 2010/0185039 | A1 | * | 7/2010 | Hoag | ........................ B09C 1/00 588/320 |

FOREIGN PATENT DOCUMENTS

JP    2002282838    * 10/2002    ............... B09C 1/06

OTHER PUBLICATIONS

Kelly, D.F. et al (1941). Analyst, 66, 489-490.*  
(Continued)

*Primary Examiner* — Brian A McCaig  
(74) *Attorney, Agent, or Firm* — Voyer Law

(57) ABSTRACT

A contaminated medium (such as soil and/or groundwater) contaminated with petrogenic and/or other organic contaminants such as petroleum hydrocarbons, light non-aqueous phase liquids (NAPLs), dense non-aqueous phase liquids (DNAPLs), persistent organic pollutants (i.e. sulfolane), chlorinated compounds, and volatile organic compounds, can be mixed with enhanced stimulators and be thermally remediated. The enhanced stimulators are heat induced to undergo exothermic reactions, which initiate a series of in-situ chemical reactions to such as to produce hydrogen gas. The hydrogen gas causes hydrocracking of heavy (Continued)

hydrocarbons to produce light hydrocarbons which can be recovered such as for future use.

13 Claims, 11 Drawing Sheets

(51) Int. Cl.
| | |
|---|---|
| *B01J 19/20* | (2006.01) |
| *B09C 1/06* | (2006.01) |
| *B03C 1/30* | (2006.01) |
| *B01D 1/00* | (2006.01) |
| *B01D 5/00* | (2006.01) |
| *C02F 1/04* | (2006.01) |
| *C02F 1/32* | (2006.01) |
| *C02F 1/72* | (2006.01) |
| *B09C 1/00* | (2006.01) |
| *C02F 101/32* | (2006.01) |
| *C02F 103/06* | (2006.01) |

(52) U.S. Cl.
CPC .............. *B01J 19/126* (2013.01); *B01J 19/20* (2013.01); *B03C 1/30* (2013.01); *B09C 1/06* (2013.01); *C02F 1/04* (2013.01); *C02F 1/325* (2013.01); *C02F 1/725* (2013.01); *B01J 2219/0879* (2013.01); *B09C 1/002* (2013.01); *B09C 2101/00* (2013.01); *C02F 2101/322* (2013.01); *C02F 2103/06* (2013.01); *C02F 2305/10* (2013.01)

(58) Field of Classification Search
CPC ... C02F 1/04; C02F 1/325; C02F 1/725; B01J 19/20; B01J 19/126
See application file for complete search history.

(56) References Cited

OTHER PUBLICATIONS

Ko, J.H. et al (2010). Journal of Hazardous Materials, 174, 876-879.*
Derwent description of Hayama et al (JP 2002282838), Oct. 2002.*

* cited by examiner

REMEDIATION OF CONTAMINATED SOIL AND WATER USING ENHANCED STIMULATORS

1. TECHNICAL FIELD

Embodiments disclosed herein generally relate to a method and system for remediating a medium contaminated with petrogenic and/or organic compounds, such as but not limited to petroleum hydrocarbons (PHCs), volatile organic compounds (VOCs), persistent organic pollutants (POPs), and relate more particularly to a method and system for remediating a contaminated medium using enhanced stimulators.

2. BACKGROUND

In recent years, the treatment of residual and historical wastes from various sources have become a priority for many industries. Due to increasing public awareness and media attention, the exploration, implementation, and importance of cost-effective and environmental friendly approaches for cleaning up sites contaminated with organic contaminants such as petrogenic hydrocarbons has increased significantly, as a mechanism to demonstrate social accountability and environmental sustainability and reduce environmental risk from contaminant exposure and migration, for example.

The environmental remediation industry interested in remediation of contaminated mediums, such as soil and groundwater, have adopted many and various methodologies for treating contaminated soil and/water media. A common practice for remediating soil is either to bury or incinerate (thermal remediation) the contaminated medium (ie. soil or subsurface materials). Burying contaminated media has its obvious disadvantages, mainly that petrogenic contaminants remain mixed with the medium and typically are not removed. Therefore, typically burying contaminated medium only covers up the mess and removes it from visible sight.

Incineration of contaminated soil also has its disadvantages. While combustion of contaminated soil media usually removes substantially all the petrogenic contaminants, it typically also removes all naturally occurring organic carbons such as phytogenic organics as well. In essence, incineration of contaminated medium results in nothing but ash. Further, incineration typically requires input of a large amount of energy. Combustion gases, such as $CO_2$, are typically also released into the atmosphere, which may contribute to global warming and may attract additional costs such as in relation to carbon emissions.

Recently, newer technologies related to thermal remediation of contaminated media have been investigated. For example, microwave heating is a relatively new remediation method, which utilizes electromagnetic (EM) waves to thermally decontaminate contaminated soil or water. A key requirement of microwave remediation is the complete penetration and activation within the treatment medium, whereby the heat created penetrates the interior of the contaminated medium.

U.S. Pat. No. 5,449,889 discloses a system for remediating a medium using a microwave energy source. A portable apparatus for dielectrically heating a medium comprises a microwave energy source having a preselected microwave frequency for emitting microwave energy.

U.S. Pat. No. 5,968,400 discloses a tandem microwave waste disposal system having two combustion chambers used for disposal of waste media, the first one in communication with a source of microwaves, and a second combustion chamber having an input region in communication with a first end of a hollow conduit.

U.S. Pat. No. 4,993,943 introduces an apparatus for the removal of higher and lower volatility organic contaminants from media such as soil. It includes a screw conveyor with an inlet, an outlet and one or more solid core flights. At least one IR source, located on the external side of the screw conveyor, is adapted to heat the media. A continuous process for removing volatility organic contaminants from soil includes agitating, manipulating, and transporting the contaminated media.

*Photo-catalytic Purification and Remediation of Contaminated Air and Water*, David F. Ollis, 2000 discloses approaches to increase the efficiency of light and catalyst utilization by adding oxidants (hydrogen peroxide), metal ions (silver) and periodic illumination. Hydrogen peroxide enhanced reaction rates by increasing the slow step of trapped electron removal. It diminished electron-hole recombination and increased the selective consumption of holes for surface oxidations. Metal ions increased some rates and catalyzed the electron transfer to molecular oxygen. Periodic illumination provided an increased photo-efficiency by factors up to 5-10 fold.

3. SUMMARY

An embodiment of the present invention generally relates to a method and system for remediating a medium, such as soil or groundwater, that is contaminated with petrogenic and/or other organic contaminants such as, but not limited to, petroleum hydrocarbons, persistent organic compounds (i.e. sulfolane), light non-aqueous phase liquids (NAPLs), dense non-aqueous phase liquid (DNAPLs), chlorinated compounds, and volatile organic compounds. Enhanced stimulators may be admixed with the contaminated medium and thermally treated to induce chemical reactions within the medium to remove petrogenic contaminants. In an embodiment, thermal remediation can involve heating the contaminated medium by exposing the contaminated medium to microwave radiation. In another embodiment, thermal remediation can involve inductively heating the contaminated medium.

A principle behind certain exemplary embodiments of the present invention involves the vaporization of petrogenic and/or other organic contaminants using an increase in temperature to induce chemical reactions within the contaminated medium, such as hydrocracking. Other principles involved include the breakdown of petrogenic organic contaminants due to increased temperature, chemical reactions (oxidation), cracking through hydrogen generation, absorption of contaminants onto stimulators, and the evaporation of water and collection of solid residue contaminants.

In one embodiment of the present invention, a method of remediating a contaminated medium, wherein the medium is contaminated with at least one of petrogenic and organic contaminants is provided. In one such embodiment, the method comprises: pre-treating the contaminated medium by admixing one or more enhanced stimulators therewith to produce a pre-treated contaminated medium; and increasing a temperature of the pre-treated contaminated medium to induce at least a portion of the enhanced stimulators to undergo exothermic reactions for initiating a series of chemical reactions in the pre-treated contaminated medium to produce a thermally remediated medium substantially reduced in a concentration of at least one contaminant relative to said contaminated medium, and a vaporized contaminant.

In an exemplary such embodiment, the contaminated medium may comprise at least one of a contaminated soil medium and a contaminated water medium. In another exemplary embodiment, the vaporized contaminant comprises a vaporized hydrocarbon. In yet another exemplary such embodiment, the enhanced stimulators may comprise a chemical blowing agent, and increasing the temperature of the pre-treated contaminated medium further comprises inductively heating the pre-treated contaminated medium to induce the chemical blowing agent to undergo an exothermic reaction.

In a further embodiment of the present invention, a remediation system for remediating a contaminated medium is provided, wherein the contaminated medium is contaminated with at least one of petrogenic and organic contaminants. In once such embodiment, the system comprises: a remediation generator for remediating the contaminated medium therein, the remediation generator further comprising an inlet for accepting the contaminated medium therethrough, at least one thermal remediation stage, and an outlet for removing a thermally remediated treated medium substantially reduced in a concentration of at least one of the contaminants; and a gas trap for containing any gases or vapors released from the remediation generator.

In an exemplary such embodiment, the remediation generator of the remediation system may further comprise a thermal remediation chamber for increasing a temperature of the contaminated medium. In another exemplary such embodiment, the thermal remediation chamber may further comprise at least one of an induction heater and a heating element. In yet another exemplary such embodiment, the thermal remediation chamber further comprises at least one of: a microwave generator, an ultraviolet radiation generator, an infrared radiation generator, an intense pulsed light generator and a combination thereof.

In a broad aspect of the invention, a method of remediating a medium, such as a ground, soil or water medium, contaminated with petrogenic organic contaminants involves pre-treating the contaminated medium by admixing enhanced stimulators therewith for creating a pre-treated contaminated medium; and increasing a temperature of the pre-treated contaminated medium to induce the enhanced stimulators to undergo exothermic reactions for initiating a series of chemical reactions to produce a thermally remediated medium substantially free of the contaminants, and vaporized hydrocarbons.

In another broad aspect of the invention, a remediation system for remediating a medium, such as ground soil or water, contaminated with petrogenic organic contaminants comprises a remediation generator for remediating the contaminated medium therein, the generator further comprising an inlet for accepting the contaminated medium therethrough and an outlet for removing remediated treated medium substantially free of the contaminants; and a gas trap for containing any gases released from the remediation generator.

4. BRIEF DESCRIPTION OF THE DRAWINGS

5. DETAILED DESCRIPTION OF SEVERAL EMBODIMENTS

Figure 1:
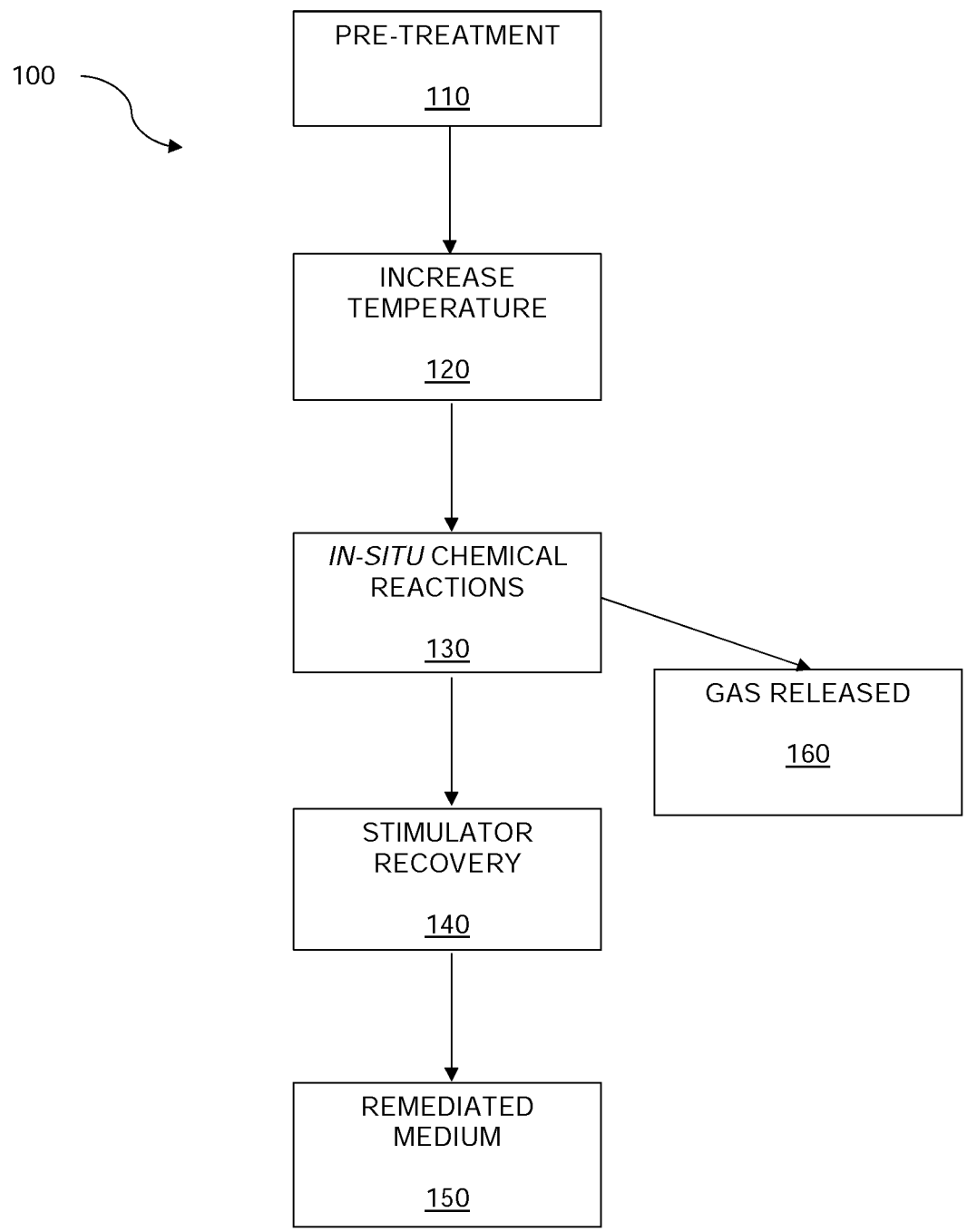
FIG. 1 is a flowchart of an embodiment of the present invention, illustrating a method for remediating contaminated ground/soil.

With reference to FIG. 1, an exemplary embodiment of the present invention includes a remediation method 100 for remediating a medium, such as a soil/ground or water medium, contaminated with one or more contaminants, such as but not limited to one or more of petrogenic organic compounds, petroleum hydrocarbons, non-aqueous phase liquids (NAPLs), dense non-aqueous phase liquid (DNAPLs), persistent pollutants (i.e. sulfolane), chlorinated compounds, and volatile organic compounds, by pre-treating the contaminated medium 110 by admixing enhanced stimulators with the contaminated medium, and increasing a temperature 120 of the pre-treated contaminated medium for causing, inducing, or otherwise initiating chemical reactions 130 within the contaminated medium (in-situ chemical reactions) to remediate the contaminated soil, separate and remove the enhanced stimulators 140 and desirably to recover a remediated medium 150 substantially reduced in concentration of at least one contaminant relative to the contaminated medium. In another embodiment, the remediation method 100 may desirably provide for recovery of a remediated medium 150 which is substantially free of petrogenic organic contaminants. In one embodiment, any gases and/or vapours which may comprise contaminant compounds and/or contaminant derived compounds created from the in-situ chemical reactions may optionally also then be recovered and such as for optional recycling 160 for future use.

In one embodiment, enhanced stimulators may include at least one of chemical blowing agents and oxidizers, and can optionally also include one or more of pyro-stimulators, photo-stimulators, surfactants, catalysts, and/or electromagnetic polarizers and combinations thereof. In a particular embodiment, enhanced stimulators can be in a powdered form or may optionally be encapsulated in a polymer matrix, such as in polymer-carbon nanocomposites. In some embodiments where the enhanced stimulators are encapsulated into a polymer matrix, the resultant encapsulated stimulator can be multi-functional, engineered to incorporate one or more of the chemical blowing agents, pyro-stimulators, photo-stimulators, oxidizers, surfactants, and/or other catalysts or combinations thereof, into a single enhanced stimulator compound. In one such embodiment, a multi-functional enhanced stimulator can be used for potentially increased synergistic treatment effects.

In certain embodiments, a multi-functional enhanced stimulator can incorporate: one or more of: 1) carbon based materials including carbon nanotubes (CNTs), graphenes, carbon nano fibers, graphites, carbon black, activated or amorphous carbons; 2) ferromagnetic materials including but not limited to iron (zero valent iron), cobalt, nickel, zinc, etc.; 3) thermo-polymer and exothermic materials for heat retention and efficiency; 4) photo catalytic materials including but not limited to iron oxide, zinc oxide, titanium oxide, tungsten oxide, aluminum oxide, etc.; 5) surfactants for homogeneous mixing of the contaminated media and stimulators; 6) oxidizing agents, including but not limited to, magnesium peroxides, zinc peroxides, calcium peroxides, sodium persulfate and hydrogen peroxides; and 7) chemical blowing agents, including but not limited to p-toluenesulfonhydrazide, 5-Phenyltetrazole, azodicarbonamide, sodium bicarbonate, potassium borohydrides, sodium borohydrides, carbonyl azides, and urea, and combinations thereof. Chemical blowing agents, when exposed to increased temperatures (usually less than 450° C.) may in one embodiment typically undergo exothermic reactions to produce heat and gaseous carbon monoxide (or hydrogen), within the contaminated medium. The gaseous carbon monoxide may then initiate a series of chemical reactions which in certain embodiment, may ultimately crack or otherwise chemically alter heavy hydrocarbons or other related complex organic compounds (such as from petrogenic contaminants or other organic contaminants for example) to produce gaseous light hydrocarbons or other lighter organic compounds, which may optionally then be recovered and may further optionally be recycled for future use, and may in one embodiment also desirably provide a thermally remediated medium that is substantially free of petrogenic and/or other particular contaminants.

More specifically, in one embodiment, gaseous carbon monoxide can react with water present in the contaminated medium to produce hydrogen gas. The hydrogen gas, in the presence of the additional heat created from exothermic reactions of the chemical blowing agents, can then cause hydrocracking of heavy hydrocarbons (hydrocarbons longer than 10 carbons in length) to produce light hydrocarbons (typically less than 10 carbons in length) which are vaporized. The gaseous form of the light hydrocarbons can be trapped, condensed into liquid form and optionally recovered, such as for optional recycling for future use. In one embodiment, an increase in ambient temperature of a contaminated medium having chemical blowing agents admixed therein results in the decomposition of heavy hydrocarbons and/or other heavy organic compounds, and the production of light hydrocarbons (ie. hydrocarbon upgrading) or other lighter derivative compounds.

In one embodiment, chemical blowing agents may typically have different activation temperatures. By mixing different combinations of two or more chemical blowing agents, it may desirably be possible to activate multiple reactions depending on the temperature levels. It is known that the increase in ambient temperature surrounding the chemical blowing agents can cause chemical blowing agents to undergo exothermic reactions.

Figure 2:
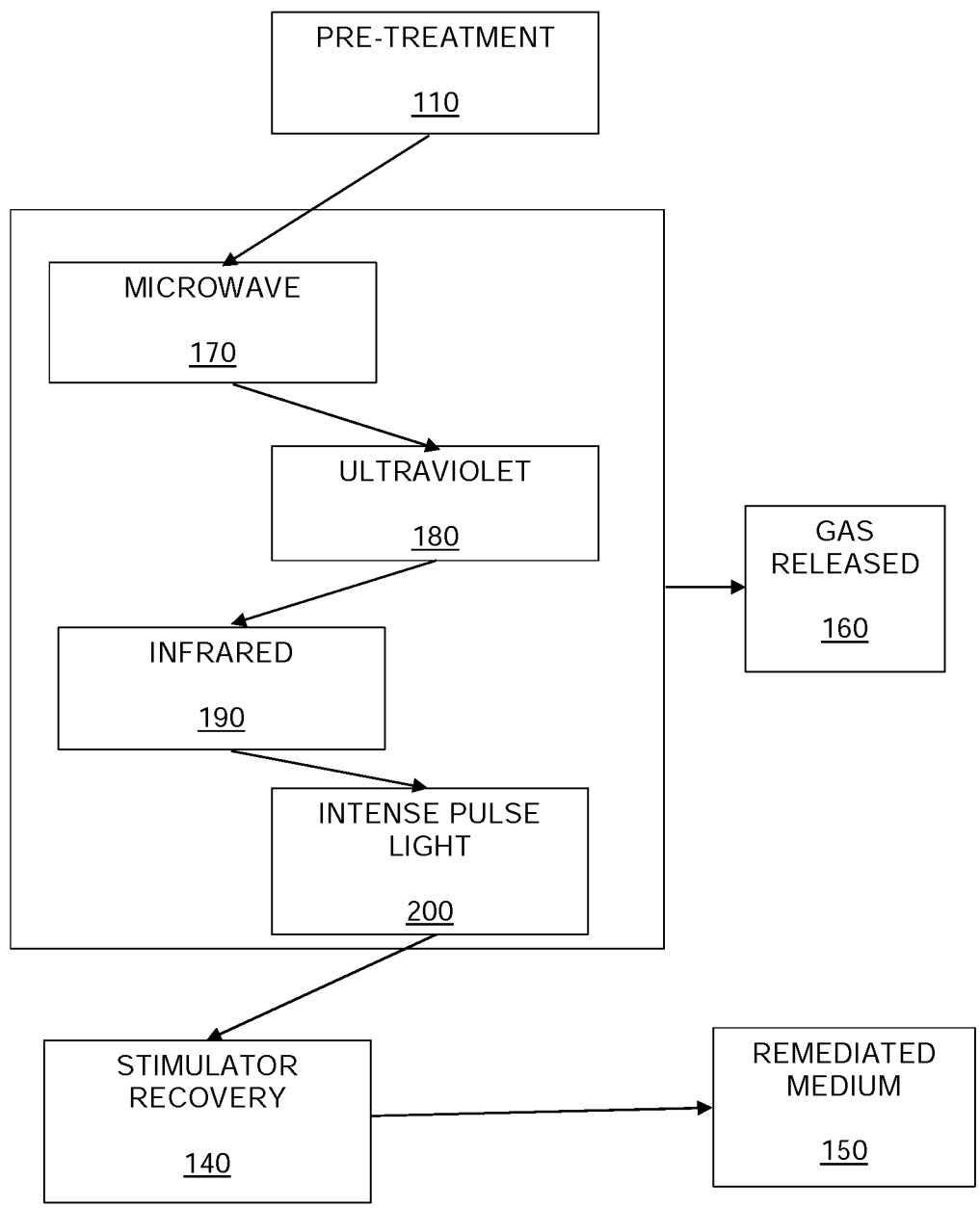
FIG. 2 is a flowchart of another embodiment of the present invention, illustrating a method for remediating contaminated ground/soil using a microwave generator, a UV generator, an infrared generator, and an intense pulse light generator.

With reference to FIG. 2, and in accordance with an exemplary embodiment, the remediation method 100 may comprise an initial step 110 of pre-treating a contaminated medium, such as soil or water, by admixing a composition of enhanced stimulators, such as one or more of chemical blowing agents, oxidants, pyro-stimulators and photo-stimulators. Once the compositions of enhanced stimulators are mixed with the contaminated medium, the pre-treated medium may then be conveyed to a remediation generator for thermal remediation, where the pre-treated medium can be exposed to an increase in temperature. As shown in FIG. 2, and in one embodiment, the increase in temperature can be a result of exposing the pre-treated contaminated medium to microwave energy 170 for activating pyro-stimulators, such as poly-carbon nanocomposites (p-cnc), present in the composition of enhanced stimulators. In one such embodiment, exposure to microwave energy can activate the pyro-stimulators to produce sufficient amounts of heat to cause or initiate chemical reactions within the pre-treated contaminated medium. Pyro-stimulators are discussed in greater detail hereinbelow.

In one embodiment, once thermal remediation is complete, the thermally remediated medium can then be subjected to photo-remediation such as by exposure to ultraviolet light 180, and optionally then infrared light 190, and finally optionally exposed to intense pulsed light 200, such as light from xenon flash units or other pulsed light sources. In one embodiment, the exposure to the various types of electromagnetic waves can be in series. In another embodiment, the exposure of the contaminated medium to multiple spectra of electromagnetic radiation, such as infrared light and intense pulsed light, can be concurrent.

Following exposure of the contaminated medium to the intense pulsed light 200, in one embodiment, the stimulators admixed during the pre-treatment step can be removed and optionally recycled 150, such as by using one or more suitable removal or recovery processes, such as a magnetic process, as discussed hereinbelow in greater detail. Further, in one embodiment, any resultant gases and/or vapours created and/or released during remediation can desirably be contained in step 160.

Embodiments of the present invention include a remediation system which reduces both the space required for operation and resulting costs. The system can include a series of electromagnetic radiation generators, such as microwave, ultraviolet, infrared and intense pulsed light generators, vertically stacked or oriented, allowing conveyance of the contaminated medium therethrough to be by pressure, vacuum or gravity flow.

Figure 3:
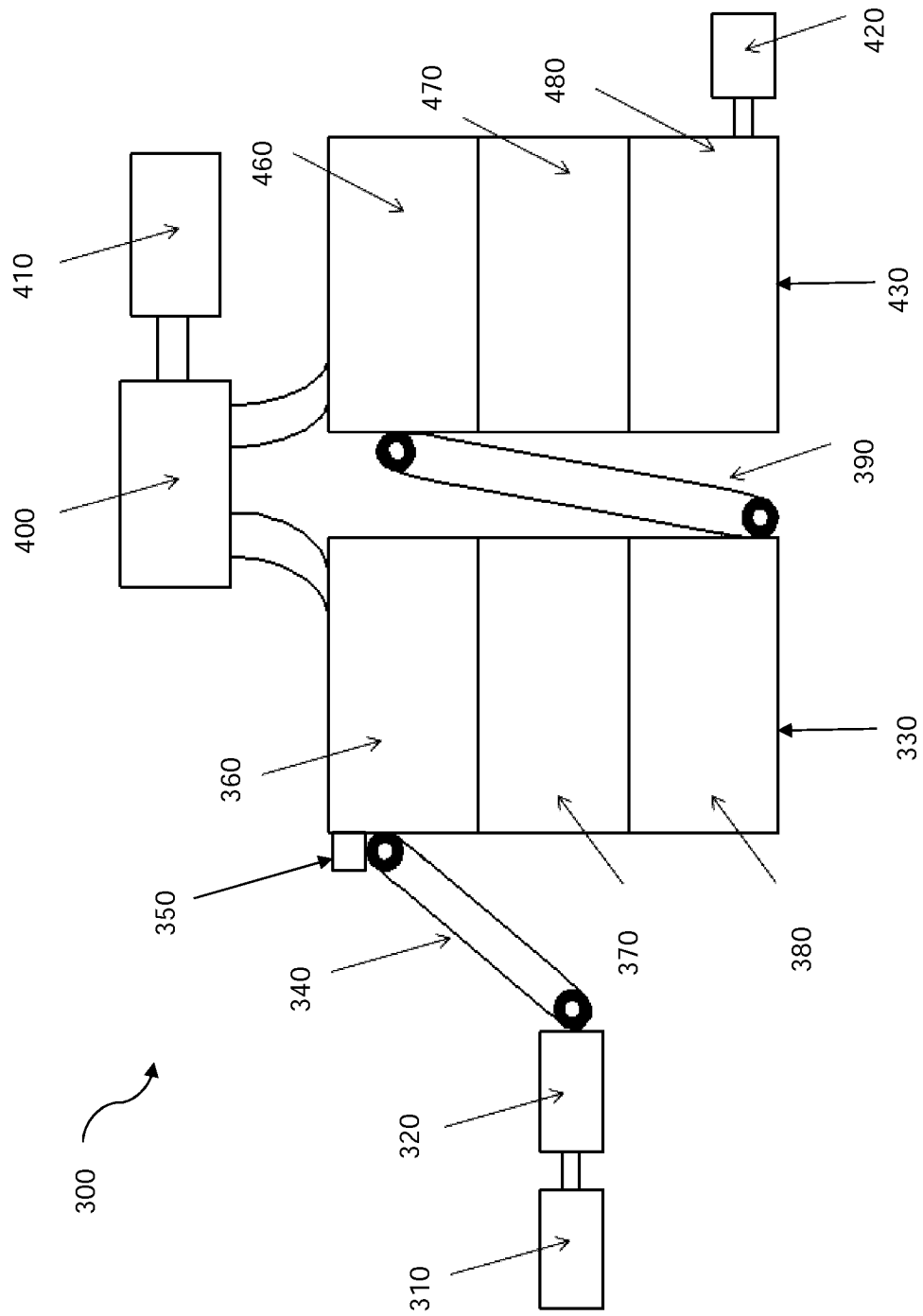
FIG. 3 is a schematic representation of an embodiment of the present invention, illustrating a remediation system having a series of generators.

With reference to FIG. 3, in one embodiment, a remediation system 300 for remediating contaminated medium is shown. A hopper 310 may be used to temporarily store and feed contaminated medium to a pre-treatment mixer 320 wherein a composition of enhanced stimulators, including chemical blowing agents, oxidizers, pyro-stimulators and/or photo-stimulators, are admixed with the contaminated medium. The pre-treated medium is then conveyed from the pre-treatment mixer to a remediation generator 330. In an embodiment, and as shown, a simple conveyor 340 can be used to convey the medium from one part of the system 300 to the next. In the embodiment shown, the conveyor 340 conveys the pre-treated medium from the pre-treatment mixer 320 to an inlet 350 of the remediation generator 330.

The remediation generator 330 accepts the pre-treated medium through the inlet 350, which enters into a microwave generator 360 for exposure to microwave radiation. Exposure to microwave radiation causes pyro-stimulators, such as p-cnc, to produce heat, which causes the chemical blowing agents to undergo exothermic reactions and in one embodiment, to produce carbon monoxide necessary to react with water. The series of chemical reactions resulting from the exothermic reaction of the chemical blowing agents may in a particular embodiment ultimately result in the decomposition of petrogenic contaminants (as discussed above) and a treated medium that is substantially reduced in concentration of at least one contaminant, and optionally desirably free of petrogenic contaminants.

In an embodiment, and as shown in FIG. 3, the remediation system 300 can be further enhanced by photo-remediation of the treated medium. Following exposure to microwave radiation, the treated medium is then conveyed to a series of photo-remediation generators, including an ultraviolet generator 370 for exposure to ultraviolet (UV) radiation, and infrared (IR)/intense pulse light (IPL) generator 380. In an embodiment, the intense pulse light can be generated from a xenon flash generator. Further still, in embodiments, exposure to IR and IPL can be done in separate generators. Photo irradiation further decomposes any residual petrogenic organic contaminants. In an embodiment, the microwave, UV and IR/IPL generators 360, 370, 380 are separate and discrete generators.

As discussed above, in certain embodiments, light hydrocarbons may be produced as the hydrogen gas, produced from the reaction of carbon monoxide and water present in the contaminated medium, crack heavier hydrocarbons present in the petrogenic contaminants. The light hydrocarbons may then typically be vaporized by the heat produced from the exothermic reactions of the chemical blowing agents, and the gaseous light hydrocarbons can be trapped and condensed in a condenser 400, and can optionally be stored in a gas trap 410. In an optional embodiment, the liquid light hydrocarbons can be later recycled such as for future use.

To minimize the size and footprint of the remediation system 300, the various generators 360, 370, 380 can be sequentially or vertically stacked and operated in series, with all remediation processes occurring within the remediation generator 330. As shown, in an embodiment, two remediation generators 330, 430 can be used in series, operatively connected by a second conveyor 390 for conveying the treated medium from the first remediation generator 330 to the second subsequent remediation generator 430, having its own microwave generator 460, UV generator 470, and IR/IPL generator 480.

The final remediated medium is then removed from the system 300 through an outlet 420.

In one embodiment, the microwave and photo remediation generators are isolated from one another and individually enclosed to increase personnel safety and reduce environmental concerns with radiation exposure. Nonetheless, as compared with incineration based thermal remediation systems known in the industry, certain embodiments of the present invention desirably exhibit sustainable and environmentally friendly effects, such as preservation of phytogenic compounds in soil, low energy usage and minimization of green-house gas emissions.

In some embodiments, multiple remediation generators can be hybridized to use in various electromagnetic (EM) frequencies. Each EM irradiation frequency band can play a role as an individual treatment unit; thus, the remediation efficiency can be improved. For example, moisture could be efficiently removed in certain EM zone, and depending on the contaminant type, EM energy in a separate zone could be adjusted to reduce operational costs.

Referring back to FIG. 3, and as shown therein, the vertical orientation of the remediation generator 330, 430 permits a low environmental footprint as the system does not require large amounts of space, as the microwave, UV, IR/1PL generators 360, 370, 380, 460, 470, 480 are stacked and may in one embodiment rely on gravity to convey the contaminated medium from one generator to the next.

Figure 4:
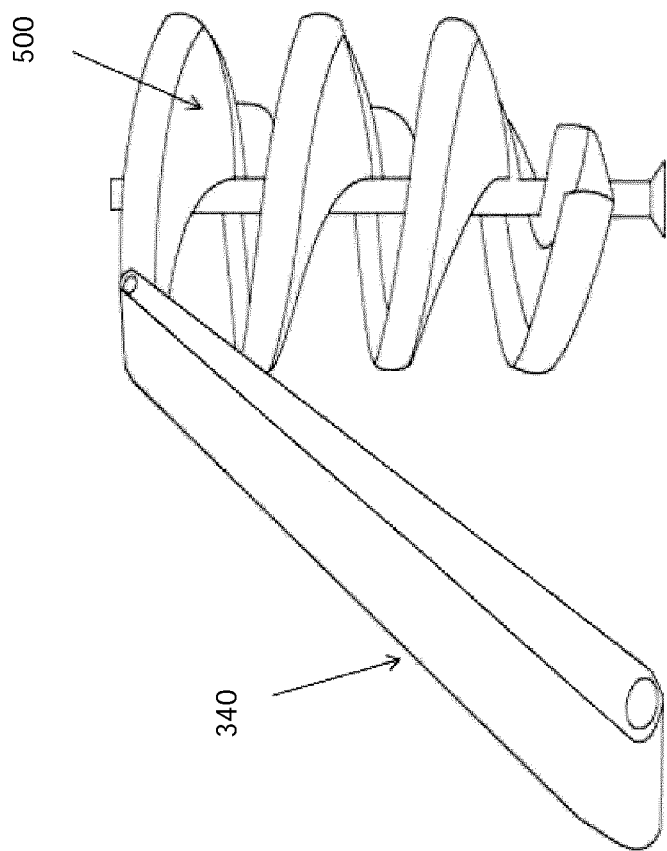
FIG. 4 is a representative drawing of an embodiment of the invention illustrating a conveyance system that can be used in the system of FIG. 3.

With reference to FIG. 4, in a further embodiment, the conveyor 340 can convey the contaminated medium from the pre-treatment mixer 320, and delivery the contaminated medium to the remediation generator 330 via the inlet 350 (see FIG. 2).

Within the remediation generator 330, the contaminated medium can be conveyed from the microwave generator to the UV generator to the IR/IPL generator via a helical slope 500, relying on the force of gravity. In other embodiments, additional forces can be used to assist in the movement of the contaminated medium from one generator to the next. Although not shown, examples of such additional forces can include vacuum suction (negative pressure) acting on the contaminated medium or positive pressure acting on the contaminated medium.

Figure 5:
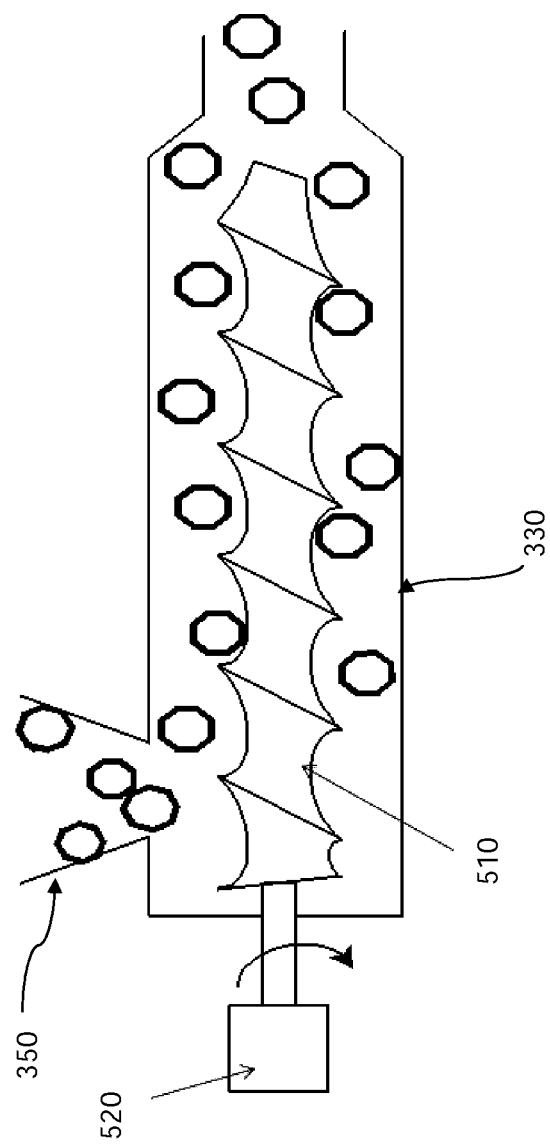
FIG. 5 is a representative drawing of another embodiment of a conveyance system that can be used in a horizontally oriented embodiment of the present invention.

With reference to FIG. 5, in embodiments where the remediation generator is oriented in a horizontal direction, a motorized conveyance method can be used to convey the contaminated medium received from the inlet 350 through the remediation generator 330. In an embodiment, and as shown, a motorized auger 510, such as driven by a motor 520, can receive contaminated medium and urge the contaminated medium through the remediation generator 330, comprising at least a microwave generator 360.

Figure 6:
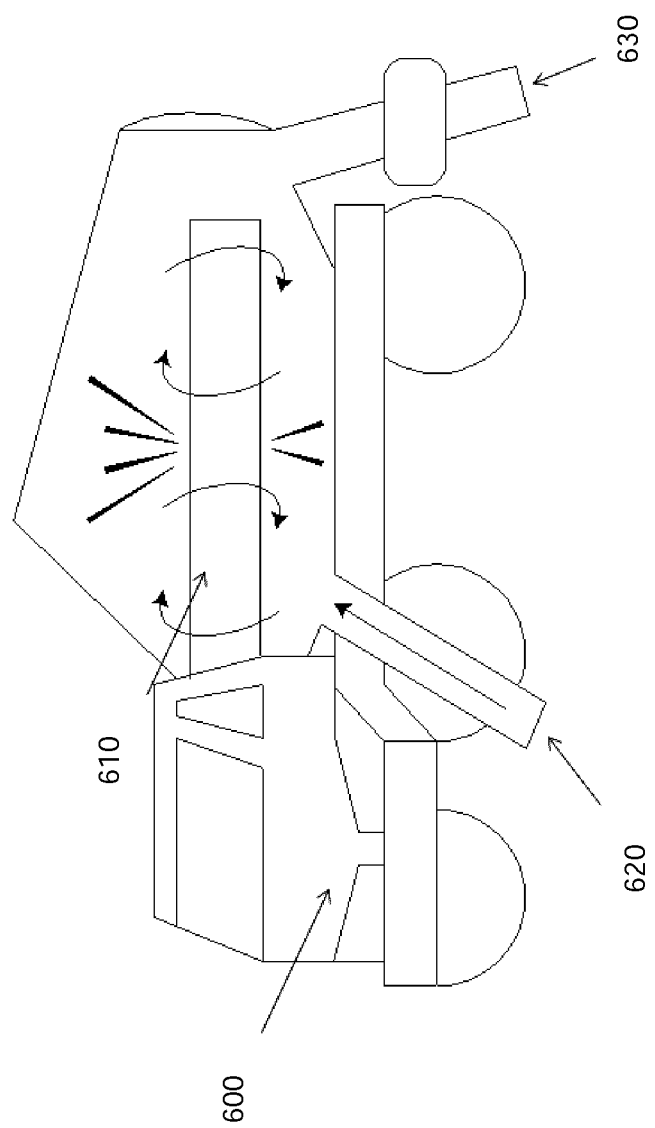
FIG. 6 is a schematic representation of a mobile platform that can transport an embodiment of the system of FIG. 3.

As shown and with reference to FIG. 6, in one embodiment, a truck or other mobile platform 600 can have a horizontally oriented and rotating cylindrical drum 610 or tumbler. Contaminated medium can enter into the tumbler 610 through inlet 620. A remediation generator, comprising at least a microwave generator (not shown), can be affixed within an interior of the tumbler 610 and the contaminated medium can be caused to rotate about the remediation generator by the simple motion of the rotatable tumbler 610. The composition of enhanced stimulators can be admixed with the contaminated medium as the medium enters into and rotates within the tumbler 610. Treated medium, substantially free of petrogenic contaminants can be expelled through an outlet 630.

In an embodiment, and to assist in mixing of the contaminated medium with the composition of enhanced stimulators, ceramic balls can be placed within the tumbler 610.

Figure 7:
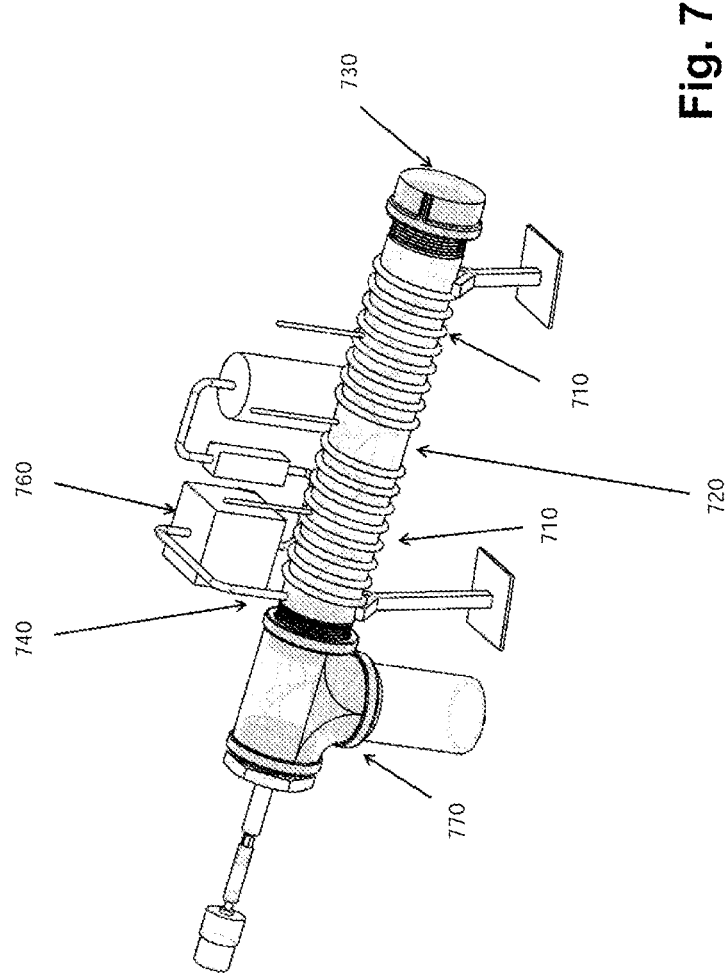
FIG. 7 is a schematic representation of an embodiment of the present invention illustrating the use of inductive heating coils.

In another embodiment, thermal remediation can be achieved, not with exposure of pyro-stimulators to microwave radiation, but rather through inductive or other heating methods such as resistive heating elements of the pre-treated contaminated medium. As shown in FIG. 7, and in one such embodiment, an inductive thermal remediation system 700 can have induction heaters or coils 710, or other heating elements, can be installed on a thermal remediation chamber 720. Through inlet 730, contaminated medium and a composition of enhanced stimulators can be mixed. In an embodiment, a motorized conveyance system, such as the auger type conveyance system shown in FIG. 5, can be used to control the movement of contaminated medium, and control the retention time of the contaminated medium during remediation. As shown, the thermal remediation chamber 720 may be horizontal, slightly tilted or vertical to enhance contaminated medium movement and retention time. To improve heating efficiency, in one embodiment multi induction heating coils can be used to create multiple induction heated zones for decreasing moisture level in the contaminated medium. The vaporized light hydrocarbons can be captured and separated through a gas trap or gas outlet 740. The gaseous form of the light hydrocarbons are first collected in a gas collection chamber 750, and then condensed by gas cooling systems 760.

The final remediated medium is then removed from the system through an outlet 770.

An embodiment of the present invention relies on heat generated by the exposure of pyro-stimulators, such as p-cnc, to microwave radiation, followed by photo-remediation. Both the thermal remediation and photo remediation can be enhanced by the use of pyro-stimulators and photo-stimulators, which are admixed, as part of the composition of enhanced stimulators, to the contaminated medium prior to entering the remediation generator. Pyro-stimulators can be activated by microwave energy to produce heat sufficient (ie. reach a temperature of about 300° C.) to cause chemical blowing agents to undergo exothermic reactions and ultimately decompose petrogenic contaminants, such as sulfolane, volatile organic compounds (such as chlorinated volatile organic compounds) and petroleum hydrocarbons, including non-aqueous phase liquids (NAPL) and dense non-aqueous phase liquids (DNAPL). Pyro-stimulators reduce the amount of energy consumed while increasing heat efficiency of the thermal remediation process.

Photo-stimulators assist in inducing photo-catalytic processes for decomposing remaining organic contaminants.

Pyro-Stimulators

In one embodiment, in order to increase heat efficiency and reduce the amount of energy consumption of the remediation system, polymer-carbon nanocomposites (p-cnc) were added to function as pyro-stimulators. P-cnc has heat absorption properties through entrapment of microwave energy, and can achieve temperatures up to 300° C. or more within a short timeframe (i.e. minutes). As a result of boiling points of many petrogenic contaminants being lower than 300° C., admixing p-cnc with a contaminated medium, and then exposing the admixed contaminated medium to microwave energy results in the vaporization and/or decomposition of many petrogenic compounds having a boiling point less than 300° C.

Remediation of Organic Pollutant Contaminated Water Using Pyro-Stimulators and Microwave Energy—Thermal Remediation To demonstrate the feasibility of eliminating organic pollutants in water, a composition of enhanced stimulators, comprising chemical blowing agents and pyro-stimulators, were mixed with water contaminated with sulfolane (a common persistent contaminant) in accordance with one embodiment. Samples of the contaminated water were mixed with various concentrations (10, 50, 100, 500, and 1000 ppm in distilled water) of p-cnc, or activated carbon, and then exposed to microwave radiation. After exposure, the p-cnc or activated carbon were removed from the samples using a syringe filter and then, using UV/Vis spectroscopy, the concentration of sulfolane (in ppm) was measured using an absorbance wavelength 304 nm. The results were compared to controls having the same concentration of the pyro-stimulator added but not exposed to microwave radiation.

Figure 10:
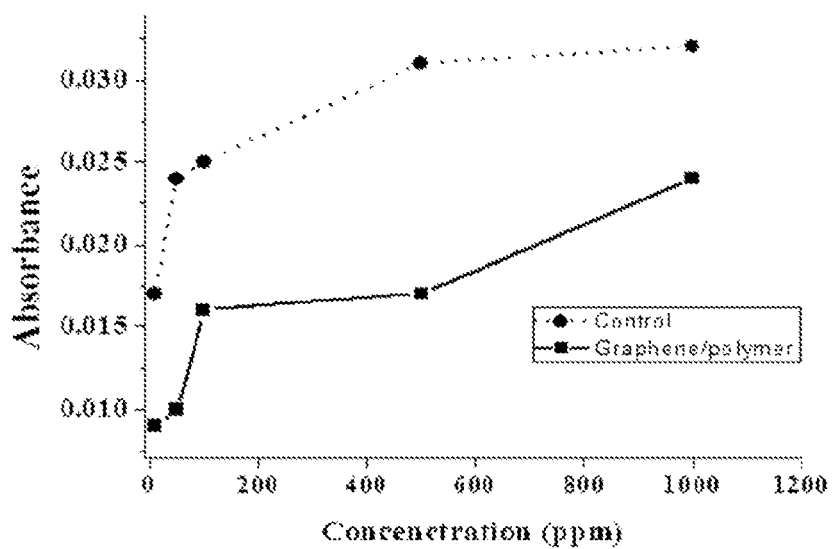
FIG. 10 illustrates p-cnc based thermal remediation effect for sulfolane elimination. The sulfolane concentration (10, 50, 100, 500 and 1000 ppm) were monitored by UV/Vis spectroscopy and the resulting absorbance is shown.
Figure 11:
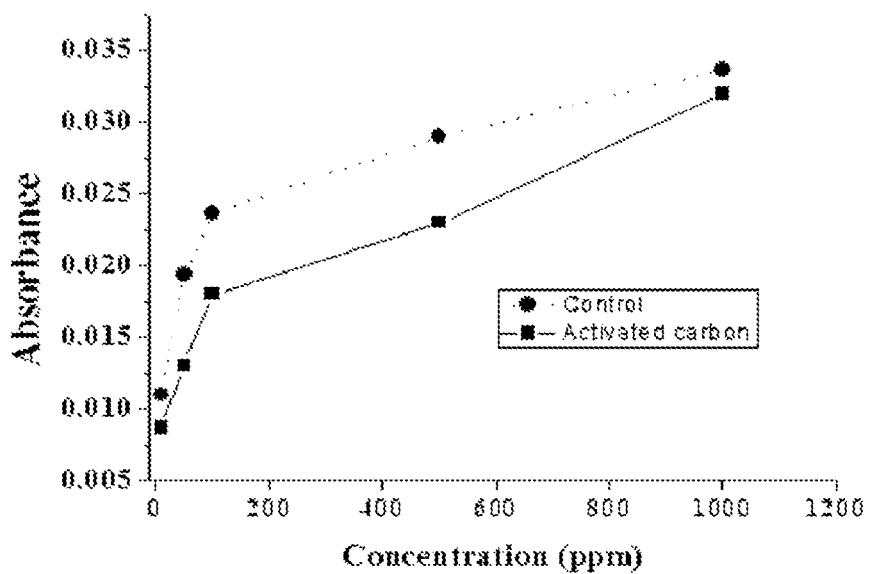
FIG. 11 illustrates activated carbon based thermal remediation effect for sulfolane elimination. The sulfolane concentration (10, 50, 100, 500 and 1000 ppm) were monitored by UV/Vis spectroscopy and the resulting absorbance is shown.

The results for the efficacy of p-cnc and activated carbon as puro-stimulators are shown in FIG. 10, which demonstrates that a substantial amount of sulfolane was removed after the p-cnc treated contaminated water was exposed to microwave radiation. With reference to FIG. 11, evidence also indicated that substantial amounts of sulfolane were removed after the activated carbon treated contaminated water was exposed to microwave radiation.

Figure 12:
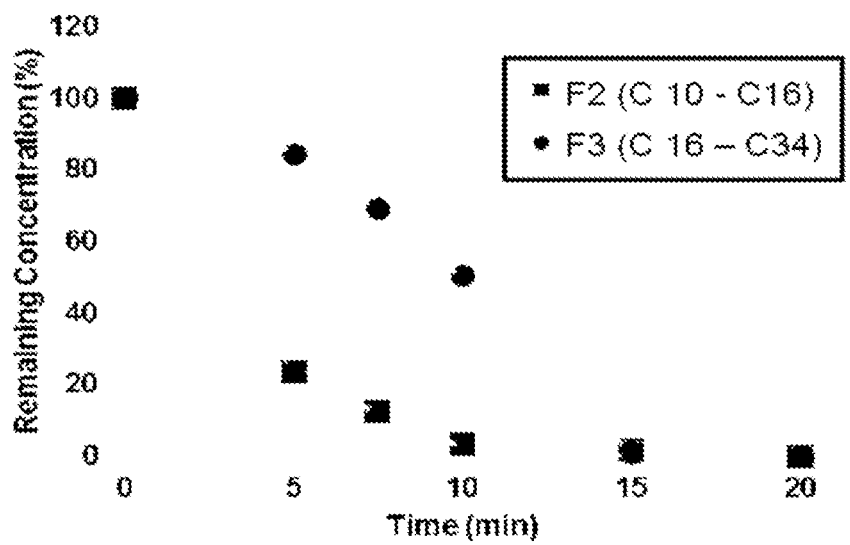
FIG. 12 illustrates the treatment results of diesel contaminated soil; residual hydrocarbon amounts after remediation. F2 and F3 symbols shown in FIG. 12 were overlapped at 15 min and 20 min points in the graph.

Remediation of Diesel Contaminated Soil Using Pyro-Stimulators and Microwave Energy—Thermal Remediation To demonstrate the feasibility of remediating diesel contaminated soil, high amounts of diesel fuel (~20 w/w %) was added into a soil and pyro-stimulator matrix containing chemical blowing agents in accordance with one embodiment. After mixing, samples of the contaminated soil were exposed to microwave radiation and monitored using a gas chromatograph. As shown in FIG. 12, short chain carbons (F2) were removed more rapidly (less than 10 minutes) and were substantially removed from the soil in about 15 minutes. Long chain carbons (F3) took a little longer to decompose, but were also substantially completed removed from the soil sample in about 15 minutes. In one such non-limiting aspect, it appears that the slower decomposition rate of the longer chain hydrogen carbons may be attributable to having a higher boiling point than the shorter chain hydrocarbons.

Figure 13:
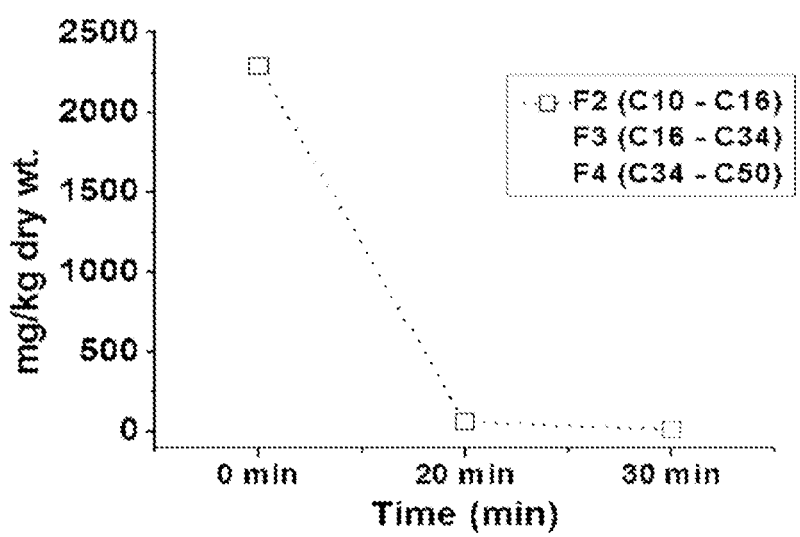
FIG. 13 illustrates the treatment results of artificial creosote contaminated soil; residual hydrocarbon amounts after remediation. F2, F3 and F4 symbols shown in FIG. 13 were overlapped at 30 min in the graph.

Remediation DNAPLs Contaminated Soil Pyro-Stimulators and Microwave Energy—Thermal Remediation With reference to FIG. 13, DNAPL contaminants were also treated using a similar system in accordance with one embodiment. A tar and diesel mixture was added into soil to create a DNAPLs contaminated matrix. In this particular case, 7 w/w % of the DNAPLs mixture contaminated soil was remediated using microwave radiation and pyro-stimulators, such as p-cnc.

Similar to the remediation of diesel contaminated soil, samples containing shorter chain hydrocarbons were removed more rapidly that those samples having longer chain hydrocarbons. Nonetheless, all samples, regardless of hydrocarbon chain length, were substantially completely removed from soil after about 30 minutes of exposure to microwave radiation.

Photo-Stimulators

In one exemplary embodiment, photo-stimulators were used to assist in inducing photo-catalytic processes for decomposing remaining organic contaminants. Photo-irradiation induced remediation processes may desirably further decompose organic contaminants. Photo-stimulators, such as but not limited to titanium oxide, iron oxide, etc. may desirably exhibit photo-catalytic properties when exposed to UV, IR and intense pulse light (IPL) irradiations.

UV Based Remediation Using Photo-Stimulator

In order to demonstrate photo-stimulator induced remediation under UV irradiation, sulfolane contaminated water was treated using titanium oxide and iron oxide as photo-stimulators in accordance with one embodiment.

Similar to the experiments conducted for the efficacy of thermal remediation using microwaves to activate pyro-stimulators, samples of the contaminated water were mixed with chemical blowing agents and various concentrations (10, 50, 100, 500, and 1000 ppm) of photo-stimulators, and then exposed to UV, IR or intense pulsed light from a xenon flash unit. After exposure, the photo-stimulators were removed from the samples using a syringe filter and using a magnetic separation (ie. iron oxides used as photo-stimulators were removed with magnets). Using UV/Vis spectroscopy, the concentration of sulfolane (in ppm) was measured using an absorbance wavelength of 304 nm.

The results appear to indicate that in some exemplary embodiments the use of photo-stimulators increased the efficacy of photo-irradiation in removing sulfolane from water.

Interestingly, titanium oxides and iron oxides used as photo-stimulators resulted in greater amounts of sulfolane being removed and thus showed greater potential.

Further Optional Embodiments

Figure 8:
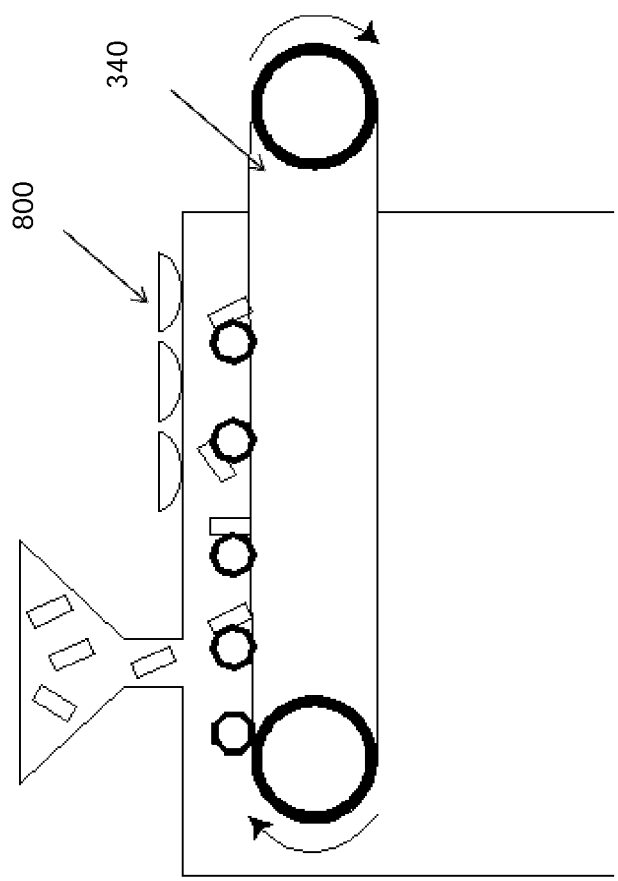
FIG. 8 is a schematic representation of an embodiment of the present invention where direct sunlight or other light sources can be focused to increase a temperature of the contaminated ground/soil using convex lenses or a fresnel lens as a pre-treatment step.

In an alternate embodiment, and as shown in FIG. 8, subsequent to the pre-treatment step, pre-treated contaminated medium can pass along the conveyor 340 and pass underneath a convex lens 800 which can redirect and focus sunlight. It is commonly known that focused sunlight can generate temperatures up to about 450° C. within a few minutes. Using focused sunlight as part of the pre-treatment step can assist in reducing the energy consumption required for thermal remediation such as by a microwave generator.

Figure 9:
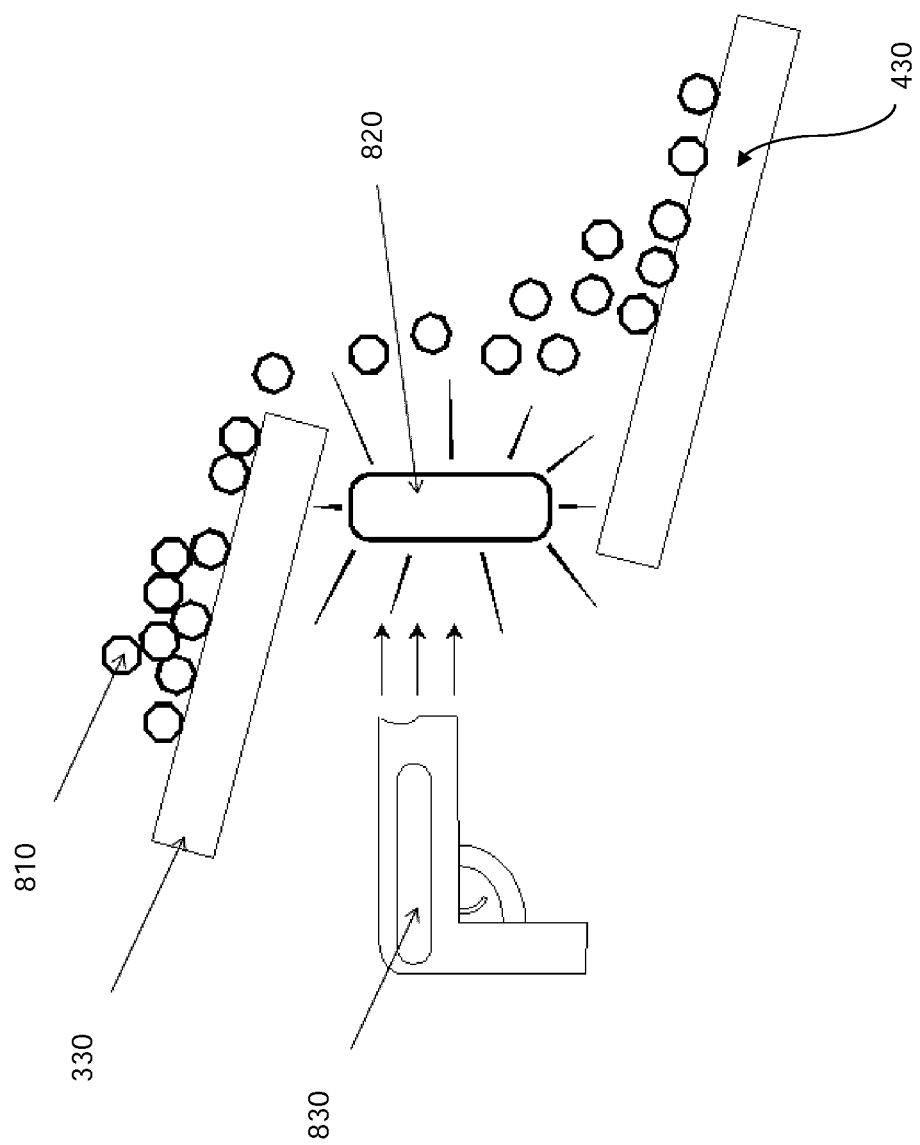
FIG. 9 is a schematic representation of an embodiment illustrating interspacial treatment of contaminated ground/soil being conveyed between remediation generators aligned in series, according to an embodiment of the invention.

With reference to FIG. 9 and FIG. 3, in one embodiment, the remediation method can further include interspacial treatment of the contaminated medium between remediation generators 330, 430 of a series of remediation generators. As shown, treated medium 810 from a first remediation generator 330, can be additionally treated by exposure to an external source of electromagnetic radiation 820 (ie. microwave/UV/IR/1PL generators) during the conveyance of the treated medium 810 to a subsequent remediation generator 430. In one such embodiment, any gases and/or vapours released during the external exposure can be redirected by a blower 830 and captured by a gas trap (not shown).

In certain embodiments, the enhanced stimulators can be extracted from the final treated or remediated medium to eliminate potential residual by-products, and in an optional embodiment may potentially be re-used. Accordingly, and in another embodiment, a separation system, such as a magnetic separation system, can be used to separate and remove the enhanced stimulators. In embodiments where magnetic separation systems are used, magnetic particles or beads can be modified, such that enhanced stimulators are functionally attached thereto, allowing magnetic systems to separate and remove the enhanced stimulators. In other embodiments, a cyclone action can be used to separate and remove the enhanced stimulators.

In a further embodiment, a method of remediating polluted soil and water with enhanced stimulators comprises using a combination of electromagnetic (EM), Intense pulsed light (IPL), Infrared (IR) and Ultraviolet (UV) irradiations to heat and photo-catalyze reactions, wherein IPL is achieved by a high power xenon light source, such as a xenon flash unit, laser irradiations may optionally be conducted for additional treatment, sunlight or white-light can optionally be focussed using convex lenses or Fresnel lenses to treat the contaminated medium, tumblers or agitators can optionally be used to induce vibration such as to expose inner layers of contaminated mediums and promote easier flow through a spiral tubular structure for enabling selective oxidation reactions by providing pressurized oxygen or hydrogen gas or air, an atomizer can optionally be used to generate and introduce fine particulates of liquid such as oxidizers (ex. hydrogen peroxide or alike) and gases such as air, nitrogen, etc. to the contaminated medium, a vacuum suction and scrubber system can optionally be used to collect vapours coming from contaminated medium during the remediation process, multiple chambers or repeated cycles for high concentration contaminants can optionally be used to increase efficacy of the remediation treatment, separation of enhanced stimulators from the contaminated medium can optionally be achieved through the utilization of filters and magnetic separation of magnetic based materials, and evaporation of water using the combination of EM, IPL, UV and IR irradiations from contaminated groundwater can optionally be used to extract solid contaminants such as sulfolane residues.

In one embodiment, a method for in-situ remediation of polluted soil and water can involve boring one or more boreholes in an area having contaminated soil and water, injecting chemical oxidants and the enhanced stimulators into the ground through the one or more boreholes, placing heating elements and/or electromagnetic radiation sources (ie. microwave sources, induction heaters, etc.) in one or more of the boreholes to activate the enhanced stimulators for remediation of petrogenic hydrocarbon and/or other organic contaminants.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof.

The invention claimed is:

1. An in-situ method of remediating a contaminated medium, wherein said medium is contaminated with at least one of petrogenic and organic contaminants, the method comprising:
    pre-treating the contaminated medium by admixing one or more enhanced stimulators therewith to produce a pre-treated contaminated medium; and
    creating an exothermic reaction for generating heat and initiating a series of chemical reactions in the pre-treated contaminated medium by increasing a temperature of the pre-treated contaminated medium for decomposing the contaminants and producing a thermally remediated medium in-situ substantially reduced in a concentration of at least one contaminant relative to said contaminated medium, and a vaporized contaminant,
    wherein the enhanced stimulators further comprises an exothermic chemical blowing agent and a pyro-stimulator,
    wherein increasing a temperature of the pre-treated contaminated medium further comprises exposing the pyro-stimulator to microwave energy for heating the pyro-stimulators and inducing the exothermic chemical blowing agents to undergo an exothermic reaction.

2. The method of claim 1, wherein the contaminated medium comprises at least one of a contaminated soil medium and a contaminated water medium.

3. The method of claim 1, wherein the vaporized contaminant comprises a vaporized hydrocarbon.

4. The method of any one of claims 1-3, further comprising photo remediating the thermally remediated medium to decompose at least one residual contaminant to produce a remediated medium substantially reduced in a concentration of at least one residual contaminant relative to said thermally remediated medium.

5. The method of claim 4, wherein photo remediating the thermally remediated medium further comprises exposing the thermally remediated medium to ultraviolet radiation.

6. The method of claim 4, wherein photo remediating the thermally remediated medium further comprises exposing the thermally remediated medium to at least one of infrared radiation and intense pulsed light radiation.

7. The method of claim 6, wherein the intense pulsed light radiation comprises light generated by a xenon light source.

8. The method of claim 4, wherein the enhanced stimulator further comprises as least one photo-stimulator.

9. The method of claim 8, further comprising removing the enhanced stimulators from the thermally remediated medium.

10. The method of claim 9, wherein removing the enhanced stimulators comprises removing the enhanced stimulators employing a magnetic removal process.

11. The method of claim 1, wherein the enhanced stimulators further comprise at least one of an oxidizer, a surfactant, and a catalyst.

12. The method of claim 11, wherein at least a portion of the enhanced stimulators are encapsulated in a polymer matrix.

13. The method of claim 12, further comprising condensing at least a portion of the vaporized contaminant.

* * * * *